United States Patent
Gordon et al.

(10) Patent No.: US 7,177,428 B2
(45) Date of Patent: Feb. 13, 2007

(54) SYSTEM AND METHOD FOR DOWNLOADING ELECTRONIC INFORMATION TO A VIDEO LOTTERY TERMINAL

(75) Inventors: Timothy Alexander Gordon, Dieppe (CA); Bartholmew Matthew Kelly, Riverview (CA); Joseph Emile Junior Cormier, Moncton (CA)

(73) Assignee: Spielo Manufacturing ULC (CA)

( * ) Notice: Subject to any disclaimer, the term of this patent is extended or adjusted under 35 U.S.C. 154(b) by 875 days.

(21) Appl. No.: 09/772,460

(22) Filed: Jan. 30, 2001

(65) Prior Publication Data

US 2002/0057800 A1    May 16, 2002

(51) Int. Cl.
    *H04K 1/00*    (2006.01)
(52) U.S. Cl. .................. 380/251; 463/29; 463/42
(58) Field of Classification Search ......... 380/251, 380/28, 25, 4, 9, 23; 713/172; 463/29, 42
    See application file for complete search history.

(56) References Cited

U.S. PATENT DOCUMENTS

| | | | |
|---|---|---|---|
| 4,446,519 | A | 5/1984 | Thomas |
| 4,599,489 | A | 7/1986 | Cargile |
| 4,930,073 | A | 5/1990 | Cina, Jr. |
| 5,265,874 | A | 11/1993 | Dickinson et al. |
| 5,429,361 | A | 7/1995 | Raven et al. |
| 5,470,079 | A | 11/1995 | LeStrange et al. |
| 5,655,966 | A | 8/1997 | Werdin, Jr. et al. |
| 5,674,128 | A | 10/1997 | Holch et al. |
| 5,721,907 | A | 2/1998 | Pyne |
| 5,759,102 | A | 6/1998 | Pease et al. |
| 5,800,269 | A | 9/1998 | Holch et al. |
| 5,902,983 | A | 5/1999 | Crevelt et al. |
| 5,919,091 | A | 7/1999 | Bell et al. |
| 5,928,362 | A | 7/1999 | Cardillo et al. |
| 6,009,524 | A | 12/1999 | Olarig et al. |
| 6,012,832 | A | 1/2000 | Saunders et al. |
| 6,014,594 | A | 1/2000 | Heidel et al. |
| 6,018,695 | A * | 1/2000 | Ahrens et al. .............. 701/200 |
| 6,041,319 | A | 3/2000 | Bass et al. |

(Continued)

FOREIGN PATENT DOCUMENTS

CA    2225805    1/1997

(Continued)

*Primary Examiner*—Nasser Moazzami
*Assistant Examiner*—Ellen C. Tran
(74) *Attorney, Agent, or Firm*—Kenyon & Kenyon LLP

(57) ABSTRACT

This invention relates to reprogramming of in-circuit programmable chips installed in video lottery terminals (VLTs) by downloading electronic information (software) to such chips. Encrypted electronic information is downloaded from a host device to a gaming terminal through a communications link. The terminal comprises a decryption component configured for decrypting the encrypted electronic information using at least two security keys, at least one said key being resident in the terminal and at least another said key being delivered to the terminal at the time of the downloading (the downloading facilitating a replacement of existing software in terminal with corresponding decrypted software obtained from decrypting the encrypted information). The encrypted information transmitted to the terminal comprises at least one next version key for later use by the decryption component in decrypting a next version of encrypted electronic information. The non-resident key may be provided to the terminal by means of an electronic plug-in security key or provided through a secure network.

41 Claims, 5 Drawing Sheets

U.S. PATENT DOCUMENTS

| | | |
|---|---|---|
| 6,048,269 A | 4/2000 | Burns et al. |
| 6,049,671 A | 4/2000 | Slivka et al. |
| 6,052,531 A | 4/2000 | Waldin, Jr. et al. |
| 6,070,012 A | 5/2000 | Eitner et al. |
| 6,071,190 A | 6/2000 | Weiss et al. |
| 6,073,214 A | 6/2000 | Fawcett |
| 6,074,434 A | 6/2000 | Cole et al. |
| 6,085,299 A | 7/2000 | Angelo et al. |
| 6,089,979 A | 7/2000 | Klein |
| 6,089,982 A | 7/2000 | Holch et al. |
| 6,113,098 A | 9/2000 | Adams |
| 6,125,307 A | 9/2000 | Heidel et al. |
| 6,128,550 A | 10/2000 | Heidel et al. |
| 6,149,522 A * | 11/2000 | Alcorn et al. .................. 463/29 |
| 6,468,160 B2 * | 10/2002 | Eliott .......................... 463/43 |
| 6,892,301 B1 * | 5/2005 | Hansmann et al. ......... 713/172 |

FOREIGN PATENT DOCUMENTS

| | | |
|---|---|---|
| CA | 2226386 | 1/1997 |
| CA | 2245887 | 7/1998 |
| CA | 2 263 776 A1 | 9/1999 |
| CA | 2319391 | 9/1999 |
| CA | 2319818 | 9/1999 |
| CA | 2 280 982 A1 | 2/2000 |
| CA | 2 286 429 A1 | 4/2000 |
| CA | 2283950 | 4/2000 |
| CA | 2283951 | 4/2000 |
| WO | WO 91/06160 | 5/1991 |
| WO | WO 99/65579 | 12/1999 |

* cited by examiner

SYSTEM AND METHOD FOR DOWNLOADING ELECTRONIC INFORMATION TO A VIDEO LOTTERY TERMINAL

FIELD OF THE INVENTION

This invention relates to reprogramming of video lottery terminals (VLTs) and particularly to reprogramming of in-circuit programmable chips installed within VLTs by downloading electronic information (software) to such chips.

BACKGROUND OF THE INVENTION

Video lottery terminals comprise non-volatile memory (traditionally, using EPROMs) for storage of game applications, operating systems, graphics and audio information. Of course, it is important that the operating system, game particulars and terminal configuration applicable to each VLT be maintained highly confidential in order to maintain the integrity of the lottery function. In the past the storage devices (semiconductor EPROM chips) containing the confidential terminal software were reprogrammed manually, on a terminal by terminal basis, by removing the chips from an electronic board socket in which they were installed, inserting them into a programmer device which reprogrammed them and then reinstalling the reprogrammed chips into the sockets of the electronic board. However, this method is labour intensive (costly in both time and money) and is subject to security failures through unauthorized copying and replacement of the storage chips.

More recently, newer package Flash™ technology has made available in-circuit programmable storage devices, referred to as Flash™ EEPROM chips, which can be programmed (and reprogrammed) without the use of a programmer by providing extra logic inside the chips which enables in-circuit reprogramming. These in-circuit reprogrammable chips are soldered directly to the logic card inside the VLT and, thus, are not easily tampered with through removal and replacement with an unauthorized chip.

Downloading of software to a VLT according to the foregoing may be done by remote or local downloading. Remote downloading achieves the delivery of new software to a VLT from a host device which is not directly connected to the VLT but is instead linked to it by means of a network link such as a wide area network (WAN) via a modem (analog, ISDN, etc.) or radio link. Such WAN-based systems are very dependent upon a wide area network controller referred to as the central site system. The advantages of remote downloading range from very low operating costs for the customer, to higher reliability of the terminal, to better response capability to market needs. Local downloading achieves the downloading of new software to a VLT by manually locating the software at each terminal and downloading the software using a direct communications link (i.e. a serial link such as RS232 or Ethernet, optical link such as IrDA, or a parallel link which provides the advantage of high transfer speed).

Local downloading does not heavily depend on the central system in use and, like remote downloading, provides the basic advantage of lowered operating costs for the customer (in that the chips do not have to be manually erased, reprogrammed and inserted into logic boards), higher reliability of the terminal, and a gain in ability to respond in a timely manner to market needs. A further advantage provided by local downloading, over remote downloading, is that the downloading operation can be performed without regard to the central system in use (from the central system's point of view there is no difference between a local download and a traditional chip reprogramming by removal). The disadvantage, however, is that trained technicians must still be sent to each machine to perform the upgrade.

The availability of means for achieving such local and remote downloading advantageously offers increased potential for improved security to VLT operators but the actual ability to achieve improved security is thereby rendered dependent on the integrity and security of the downloading system itself. Accordingly, there is a need for providing improved security to the downloading operation for downloading software to a VLT.

SUMMARY OF THE INVENTION

In accordance with the invention there is provided a system and method for downloading encrypted electronic information (software) from a host device to a gaming terminal e.g. through a communications link between the host device and the terminal (the downloading facilitating a replacement of electronic information stored in the terminal with corresponding decrypted information obtained from decrypting the encrypted information). The terminal comprises a decryption component configured for decrypting the encrypted electronic information using at least two security keys, at least one said key being resident in the terminal and at least another said key being non-resident and delivered to the terminal at the time of the downloading. A host component is configured for transmitting the encrypted electronic information from the host device to the terminal, wherein the encrypted information comprises at least one next version key for later use by the decryption component in decrypting a next version of encrypted electronic information. A receiving component is configured for receiving the encrypted information at the terminal. Delivery means is configured for delivering the other key to the terminal at the time of the downloading.

The encrypted electronic information is in the form of packs comprising a full set of files for updating the terminal's existing software. The communications link may comprise a cable coupled to parallel ports of the host and terminal and the delivery means may comprise an electronic security key, with the encrypted information also then comprising assigned bit information associated with a next version electronic key for later use in providing said other security key for decrypting a next version of encrypted electronic information. The cable is preferably wired to provide crossed control lines and bidirectional communications for data transfer.

Preferably the electronic security key is configured for providing means for decrypting an encrypted master reset component in the terminal. The electronic security key may also comprise information usable by the terminal to distinguish different electronic keys from each other.

Alternatively, the communications link may be a secure network (e.g. an ethernet network) with the delivery of said other security key provided by means of such network.

BRIEF DESCRIPTION OF THE DRAWINGS

Reference will now be made to the accompanying drawings which show, by way of example, a preferred embodiment of the present invention.

DETAILED DESCRIPTION OF THE ILLUSTRATED PREFERRED EMBODIMENT

Figure 1:
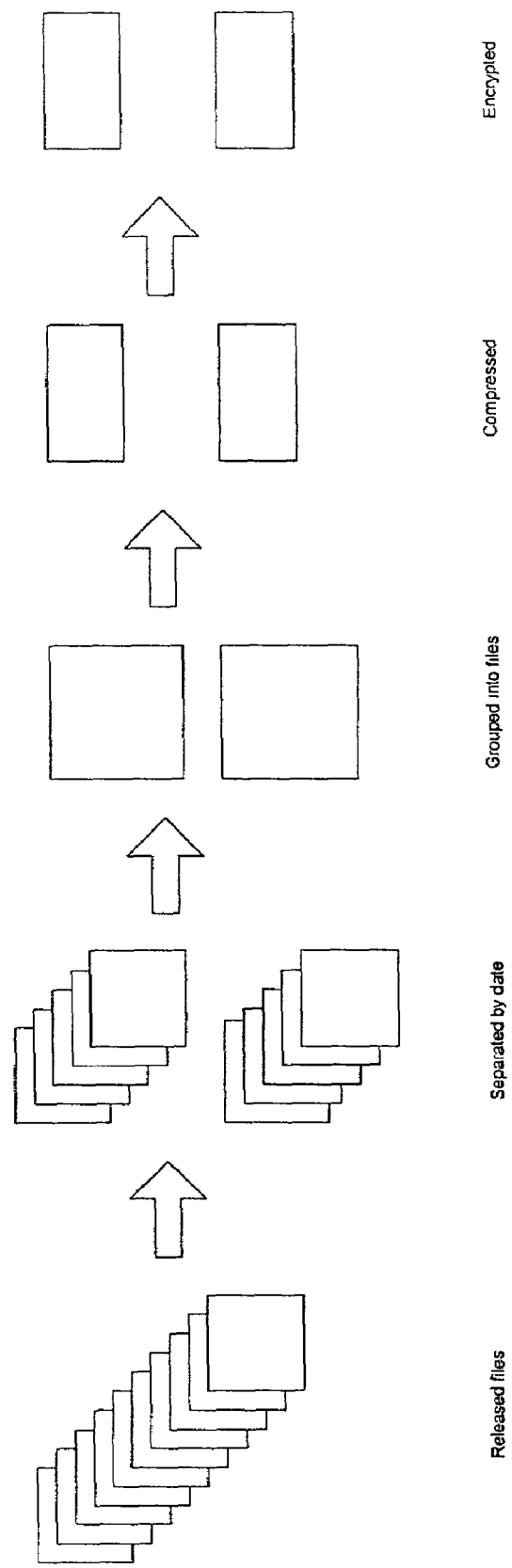
FIG. 1 is schematic block diagram showing the structure of the data file packs which are downloaded to a VLT in accordance with the present invention.

In accordance with the present invention a high level of security for downloading upgrade software files to a VLT is achieved by the following means:

1. For both local and remote downloading, a full set of new release software files are structured into "packs" (generally referred to herein as electronic information) which are compressed and encrypted before locating the packs for downloading by a host device (e.g. computer);
2. For both local and remote downloading, a security key required for the encryption/decryption is located in the VLT in the existing version of software to be upgraded (with two such keys being used in the preferred embodiment described herein, both having been provided to the VLT at the time of the previous installation when the existing software version was installed), and another (different) required security key is supplied to the VLT at the time of the downloading session such that it is only when the encrypted information is inside the VLT that it is decrypted and saved; and,
3. For local downloading, the downloading link is made through a parallel port cable between the downloading host (the external computer) and the VLT and the other required security key (being a third key in the preferred embodiment), not resident in the VLT, is in the form of a solid-state security key (referred to herein as an electronic key) which is physically coupled to the VLT prior to the download session. For remote downloading, the new release software packs are located in a host device which is remote from the VLT (e.g. a site controller or even another network VLT) and downloaded to the VLT through the Ethernet network.

The VLT saves all game application code, operating system modules, graphics and audio in individual, simple, unencrypted files. The file system allows loading of individual files, marking for deletion, opening new files, writing to new files, as well as a defragmentation which defragments the file system to recover free space created when files are deleted. A file is updated by deleting the old file and saving the new file (and, possibly, recovering the deleted file space in the middle). However, since upgrade software seldom requires that all installed files be replaced, a download of a new version involves only the files which must be replaced. The downloading operation includes the step of choosing which files to replace based on their ages and checksums.

The basic form of security, for both remote and local downloading, is the encryption of the information (i.e the files of the new release software) to be transferred to the VLT. For the preferred embodiment the general type of encryption method chosen is called Triple-DES™ but any number of other suitable encryption algorithms, provided they are inherently secure, could instead be selected for use. Unlike the usual Triple-DES encryption process, which uses two encryption keys (as well-known in the art, a key being a 56 bit number), the inventors apply three keys to the encryption process. Normally, data being encrypted via Triple-DES has two keys ("A" and "B") applied to it whereby a first key ("A") encrypts the data using DES™ (i.e. single DES), then a second key ("B") encrypts the result and then the first key ("A") is applied again, such that the DES algorithm is performed three times but uses only two keys. In the present invention three different keys are used, one for each operation of the DES algorithm. This increases the effective number of encryption bits from 112 to 168 and, because of spatial and time differences which are applied in locating the three keys and their usage, a very high degree of security is provide to the downloaded release files and their proper installation within the VLT.

As illustrated by FIG. 1 the data to be encrypted is in the form of a full set of large files, each large file being composed of many smaller files grouped by date, which make up a software release for the VLT. A typical release comprises up to ten of these large files, with the actual number of object, graphic and audio files normally numbering in the hundreds. One of the source files of the set of large files for each VLT software version is provided with the two security keys which will be required to decrypt the next version and, for local downloading capability of the software, with assigned bit order and start point information which will be required for local downloading to extract a third security key from an electronic plug-in key (and these keys and assigned bit order and start point information are stored with the software/VLT source for future use). The large files are compressed prior to encryption and this is beneficial because it tends to randomize the data to be encrypted. Encryption of the compressed files results in a set of new files, referred to herein as packs, which are very secure. Advantageously, by downloading these packs to a VLT a full set of new release software files are delivered to and installed in the VLT; not simply a subset of files or partial files comprising differences between files. The three keys used to encrypt these packs are not disclosed to the customer (client) and are closely guarded by the VLT source. Only the VLT source (and it authorized agents such as a testing lab) are provided the particulars of these keys.

The packs must eventually be decrypted using the same method of encryption. Thus, each and every VLT must know the three 56 bit keys to be able to extract the original files for upgrade. The downloading system of the invention locates two of the three keys needed to decrypt a set of packs for a new version of software in the previous version installed in the VLT. Advantageously, this avoids handling and general distribution of these two keys during an upgrade. The third key is either extracted from a physical electronic key that is plugged into the VLT (using a known bit order assignment which was also located in that previous software version), if local downloading is performed, or is communicated to the VLT over a secure network link (a WAN), if remote downloading is performed. Because two of the three keys are stored in the previous version of the VLT software, a set of packs can only be used to upgrade a particular (predetermined) software version to another particular (predetermined) version. Thus, in order to be able to upgrade two different software versions resident in two different VLTs to a common version, two different sets of packs must be created and used and any attempt to upgrade a software version using a set of packs that has not been made for upgrade of that version will fail (specifically, the upgrade software in the VLT will not attempt an upgrade at all). Thus, the present invention ensures that version upgrades are performed in a controlled manner and a "rogue" (old) VLT cannot be upgraded to a new version without there being an intention to do so by the VLT source.

Common to all central management systems is an ability to perform a calculation on the expected contents of any VLT's memory, to ask the VLT to do the same, and to then compare the result provided by the VLT to that calculated by the system itself. Performing an upgrade by downloading files differs from the situation where the chip is removed, reprogrammed and reinstalled in that the information stored by downloading may not always be in the same order (e.g. file A may be located after file B as compared to an ordering as "file A, file B" for the chip removal/reprogram situation). Check summing of non-contiguous files must be done in some standard order and, to do so, an image of files in alphabetical order by filename is produced. All central systems require an image upon which to perform a checksum calculation, and that image is made up of all of the alphabetically ordered files in the chip. Some markets do not require game-outcome determining files in the image, so images created for those market are made up of all executable files in alphabetical order.

The image, when used by the central system, must not be encrypted so the image must be manually encrypted, using different keys than those used to encrypt the upgrade data (i.e. to maintain their security), and the image decryption keys must be delivered in some way to the central system supplier such as by mail, phone or secured e/mail. Of course, the image is the same for a given upgrade version regardless of the requirements of the encryption keys for the encrypted packs.

Figure 2:
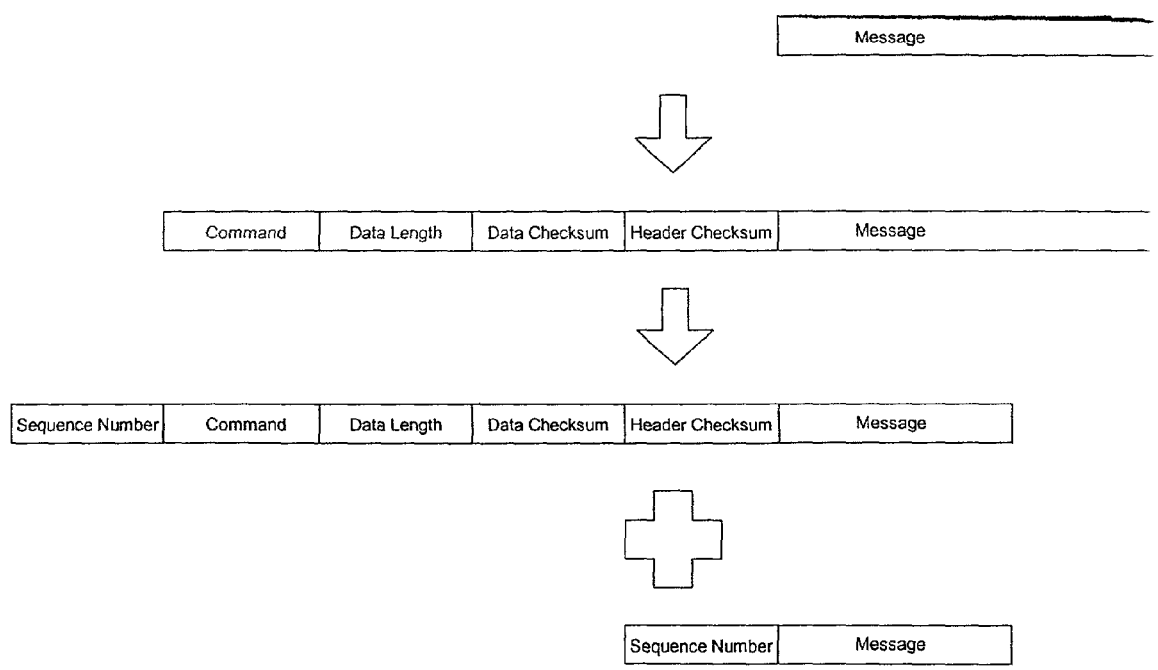
FIG. 2 is a schematic block diagram illustrating the packet structure utilized by the host driver.

The download host device, used for local downloading in the preferred embodiment, is a laptop or desktop computer (PC) using a Windows NT or Windows 2000 operating system and running a parallel port driver and server application which supplies the host-side of the communications link to the VLT. The standard PC parallel port is used in a mode called ECP (Enhanced Capabilities Port) in which DMA (Direct Memory Access) cycles can be performed and interrupts generated based on either DMA completion or signaling from a single line on the parallel port. Both sources of interrupt are used in the special parallel port driver. The driver looks for signaling from the other end of the parallel port cable (the client-VLT driver), reads a number of bytes indicating packet information and length, sets up the DMA transfer, and waits for it to finish. The host application gets the packets received by the driver, figures out what is being requested, and prepares new packet(s) to give to the driver to send back to the client. The driver breaks large packets up into smaller sub-packets, as and if required, to meet the hardware requirements of the DMA transfer mechanism. Furthermore, the application provides a user interface to watch the packets being requested by the client. The download host (being the combination of the driver and the application) does not have any encryption/decryption ability and acts as a simple server of files. FIG. 2 is a schematic block diagram illustrating the packet structure utilized by the host driver.

Figure 3:
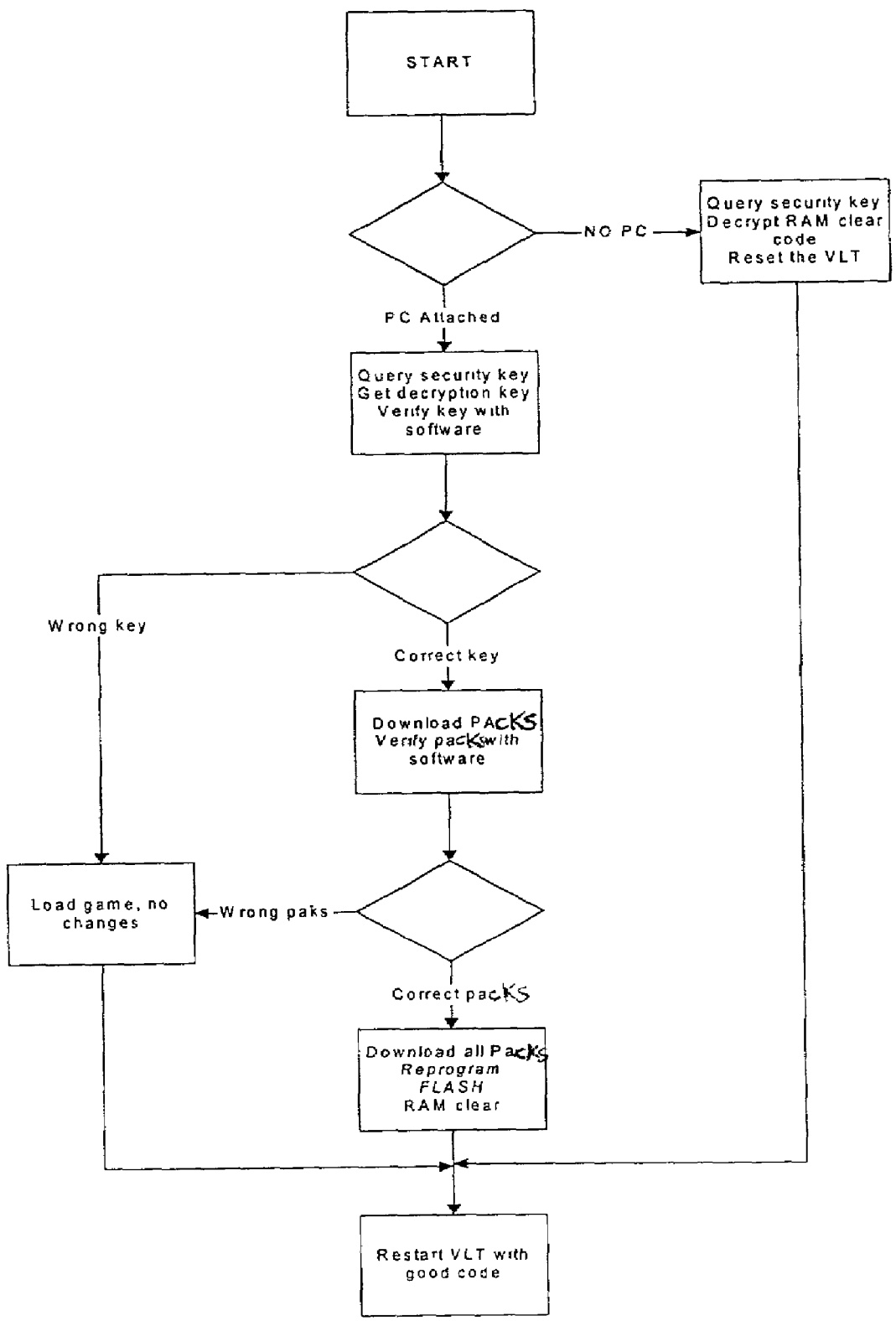
FIG. 3 is a flow chart diagram showing steps performed by the client (VLT) for downloading packs in accordance with the invention.
Figure 4:
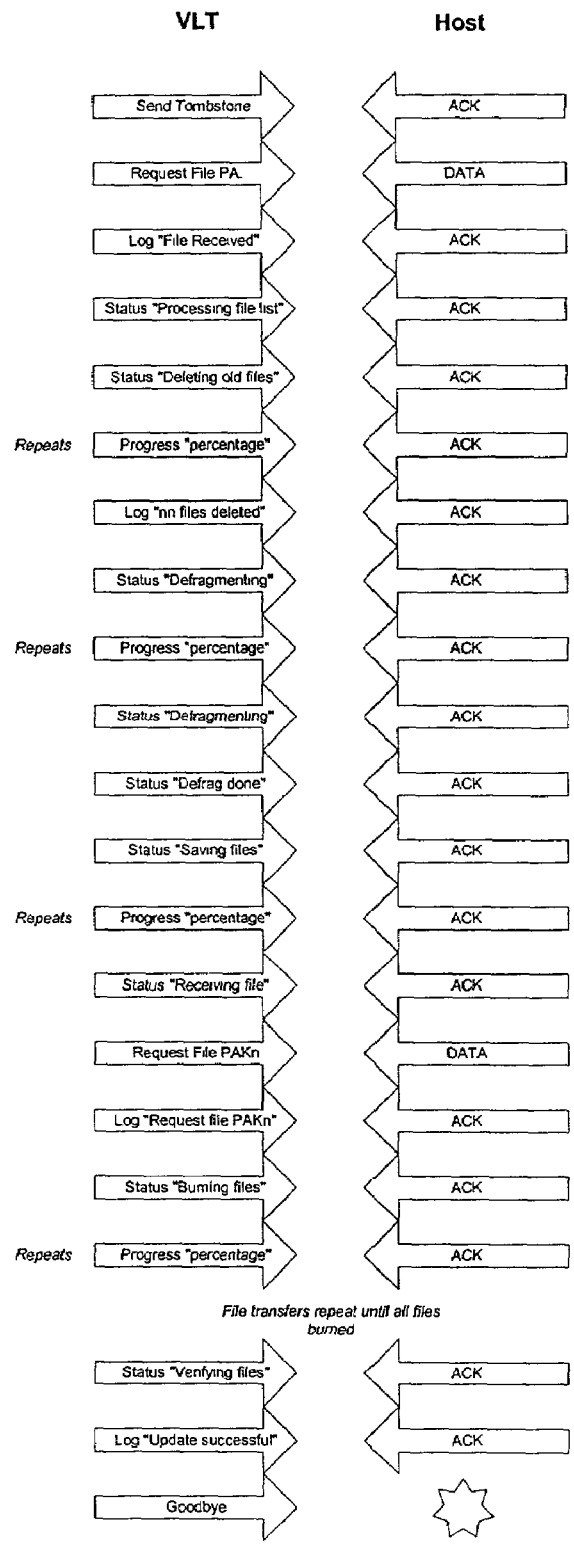
FIG. 4 is a schematic diagram showing a typical sequence of host computer-client VLT commands occurring during downloading of packs; and, FIG. 5 is a schematic wiring diagram for a cable linking a host PC and the VLT for local downloading.

The download client consists of a driver and application in the VLT and acts as the master in the download link. For local downloading the client driver also uses the parallel port in the VLT in it's ECP mode (like the host) so that DMA transfers and interrupts can be used. The client driver is specially configured to recognize an electronic security key (i.e. the physical, plug-in security key used for local downloading which is commonly known to persons in the art as a "dongle") and extract from the bit stream generated by the electronic key the third required decryption key. This is done using the assigned bit order information which is resident in the existing software version and was provided with it. Upon power-up, the client driver looks for any key, and if both the correct key for the application and version of software are detected, a downloading cycle is permitted to start. If no key is detected, or if a key is detected but it is not the correct key for the software version or market, the client driver and application for downloading do not continue to run but normal operation of the VLT does commence. FIG. 3 shows, in flow chart form, the steps performed by the client for the downloading of packs. FIG. 4 shows a typical sequence of host computer-client VLT commands occurring during downloading of packs.

The client driver is able to send and receive sub-packets of information, assemble them into packets, and pass these packets to the client application (i.e. when receiving). The client application is able to create packets for requesting files, for sending information and for receiving files. The files that are received are the packs previously described, which are encrypted, so it is also necessary that the client application (i.e. the application in the VLT) be able to decrypt the pack and extract the files necessary to update the code, graphics and audio of the VLT.

When the download of information is complete, the VLT performs a master reset, resets itself, and restarts. Because the downloaded software then requires a different key for any further download, another downloading cycle is not started. Therefore, the game application commences to play as if no downloading cable, or key, were present. Where the upgrade has been performed by a local download the VLT requires a power cycle to restart. If a remote download is used the VLT will reset itself, boot the new software, and execute it and a subsequent checksum of the memory will result in the correct value expected by the central system.

Figure 5:
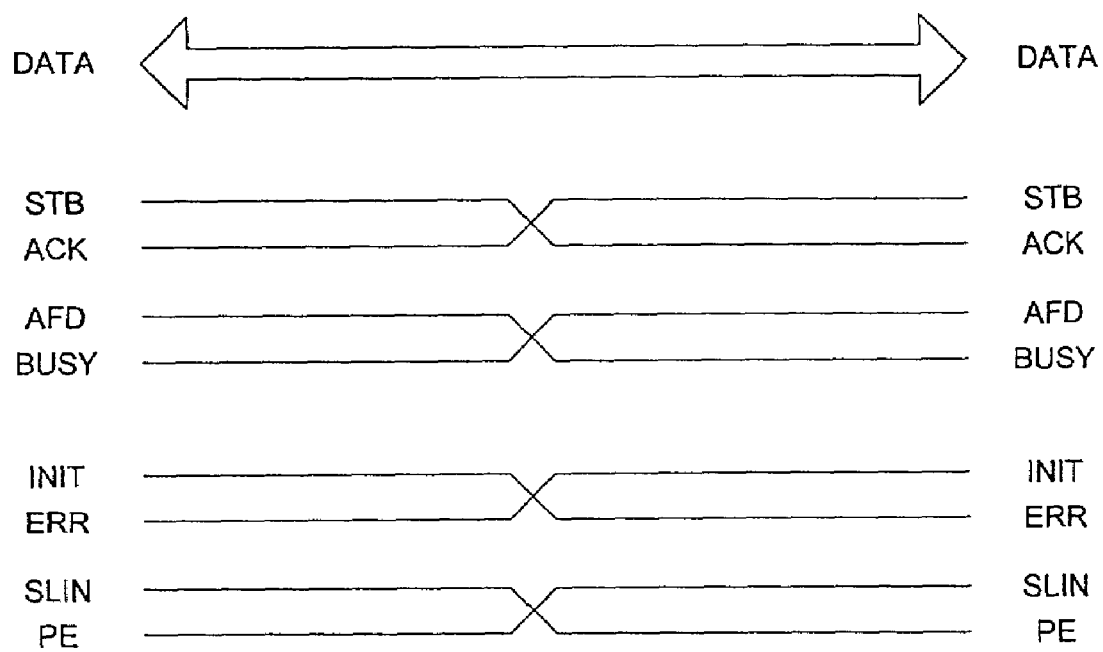

The parallel link cable used for local downloading to transfer information between the host (the computer) and the client (the VLT) is specially wired as a parallel crossover cable. The parallel data lines are straight, but the control signals are crossed over to permit the hardware of the ECP parallel port to perform correctly. The wiring is similar to Microsoft's CE™ link cable except that, as illustrated by FIG. 5, a couple of pairs are cross-linked to permit interrupt use between packets and, thereby, maintain polling-free operation of the driver.

The electronic security key (comprised of both hardware and software), used for local downloading, allows the downloading to execute and provides a part of the information (i.e. the bit stream from which the third security is extracted) required to decrypt the the packs being downloaded. This security key is physically plugged into the VLT's parallel port and the download cable is plugged into the key. Unless the correct electronic key is in position communications on the download cable will not commence. The electronic security key has a signature that is checked by the VLT's parallel port download driver to determine if it is the correct key for the software version existing in the VLT. It also has some secure memory, which can be set (by the customer) to a code that the downloading client looks for. This gives the client the ability to distinguish between electronic keys used for different software versions. As stated, the key extracted from the electronic security key is one of the three keys required for use by the decryption process in the client application and, advantageously, this means that one of the keys required for successful decryption of the download information never resides in the VLT.

A master reset function is used to initialize all game state and accounting information to a known starting point. Advantageously, the electronic security key is also used as the trigger for a full master reset. If this key has the proper signature, and the secure programmable memory has the correct code for the version of software, it allows the download tool to do a master reset without downloading any new code, graphics or audio. The master reset code is saved as a file, but unlike all other files, it is encrypted in the same manner as the packs which are sent to the VLT over the download link. The encrypted code resides in the VLT, waiting to be decrypted and executed. In addition to allowing this master reset code to run, the electronic security key also provides the third key required to decrypt the code and this offers added protection against unauthorized master resetting of the data in the VLT.

The specific steps performed for locally downloading new release software differ from those required for remote downloading but their mechanisms are essentially the same. Both types of downloading perform the following common steps:

1. Packs are created by means of three keys, two from the previous version of software (chosen at that time), and one to be delivered to the VLT at the time of the download.
2. An image of the new release is created for central use, encrypted via three other keys, chosen immediately.
3. In practice, an independent, secure testing lab repeats steps 1 and 2 to provide a security check for the operations of the download source.
4. The packs and the image file are delivered (emailed, surface mailed on CD) to the customer (the security level of the medium used for this being unimportant since a very high level of security is provided by the foregoing encryption method of the present invention which renders the decryption keys highly secure).
5. For local downloading, the packs are put into a laptop computer which is taken to the field location of a VLT and the packs are loaded into the VLT.
6. For remote downloading, the packs are put into a central site computer, downloaded over a WAN to a VLT through a site controller or directly to a VLT (and all VLTs at that site are updated therefrom).
7. The image is installed in the central site computer for checksum verification purposes.

A. Local Downloading

Local downloading requires a storage device that can hold the packs for at least one version upgrade and a laptop (the host) is used by the inventors for this purpose (with Windows NT or Windows 2000 installed therein). The host driver sends, at the VLT's request, whatever pack file is needed. As stated, the communications protocol used by the host driver corresponds to that of the client driver contained in the VLT except that it is written for the Windows operating system. The host driver's functionality is limited in that it only supplies files. The host does not have the ability to ask for files from the VLT or to decrypt the pack files.

Use of the ECP mode of the parallel ports of the host computer and VLT permits high performance data transferring through the use of interrupts, DMA transfers and FIFOs, all contained in the hardware of the parallel port. The ECP mode of the port also allows effective bi-directional communications, and this ability is exploited in the transfer of information. The parallel port was selected for use in this embodiment because of its relative speed advantage, but the same protocol can be used over any link, whether it be RS232 serial, Universal Serial Bus (USB), Ethernet or any other point-to-point communications setup (in which case it would be necessary only to change the lowest level hardware driver upon which the protocol software layers may execute on an "as is" basis).

Electronic security key access occurs before any communication transfers occur such that the electronic key acts as a gate to allow local downloading. The VLT queries the parallel port as soon as the basic drivers and operating system are loaded. The driver for the parallel port is a part of the basic subset of drivers required to start the VLT and it allows access to the electronic key without affecting the operation of the download host notwithstanding that they share the same communications lines (the electronic key plugs into the VLTs parallel port before the download cable is plugged into the electronic key). If the VLT does not find an electronic key, or if an electronic key is found but it is the wrong key for the particular version of software existing in that VLT, the process is aborted and the game starts up normally (even if a host computer is plugged in).

If a host computer is not connected, the client application still queries for an electronic key and uses it instead to single-DES decrypt RAM Clear code which executes and initiates performance of a master reset. The VLT must then be powered off, the electronic key removed and the VLT powered back on, and the game then starts normally. Also, if the first pack downloaded does not decrypt properly, the downloading process is aborted and game play starts.

In addition to being a decryption key required for downloading a new version of software and used for decrypting the RAM Clear code, the electronic key holds a programmable version number that is used to distinguish the version that different keys in the same market are configured for. This means that a customer can securely reprogram only a single key to allow a given software version ("X") to be RAM Cleared or upgraded to a different version ("Y"). If the electronic key is not programmed for the correct version it will not allow RAM Clear, or downloading, to occur even though it may hold the correct decryption key. Advantageously, this allows a customer to maintain more control over the keys that it distributes to its technicians.

The communications link is configured according to the ISO (International Standards Organization) software model which specifies a pyramidal approach to software design, the top section comprising the application layer, the middle section comprising presentation and session layers and the bottom section comprising transport, network, link and physical layers. The client (VLT) software is based on three files as follows. The first file contains all of the hardware-specific parallel port code for transmitting small (up to 60 kB) packets and represents the bottom of the ISO pyramid (i.e. the physical through transport layers). The second file corresponds to the second layer of the pyramid and comprises code that collects packets from the bottom layer (through messaging) and assembles them into messages according the well-known, conventional programming procedures. This file is responsible for verifying that there were no transmission errors, and if there were, for requesting the same information or resending the same information again. When a full, valid message has been received or sent, it notifies the application (being the next layer up) of this through messaging. The application file (the top layer) uses the messages, which might contain a pack or a directive, and sends messages back across the link. All three file layers communicate via messaging so that if one layer must change the next layer up does not need to change accordingly. Therefore, if the physical medium changes only the bottom layer must be modified.

According to well known programming procedure, each layer exists as a separate state machine. The first state machine (designated "PARPORT") is the lowest ISO level. This machine (and the presentation machine) is duplicated in both the client and host. The link when using the parallel port is a half-duplex communications medium which means that both ends of the link cannot speak at the same time. Because no arbitration hardware is used the protocol must ensure that control of the line is passed back and forth properly and this is achieved by giving control to the client (VLT) to speak first. Once the client starts communications control is passed back and forth between the client and host.

All communications are broken up into sequenced packets, sized 60 kB or less. Furthermore, the protocol used allows one end of the link to repeatedly send packets without needing to pass control to the other end but, eventually, control is passed back to find out if there was a failure or error in transmission, and to give control to the other end for transmission. As indicated above, the cable connecting the VLT to the PC is made up of a series of crossed control lines—by crossing the control lines communications from either end can be done symmetrically. The cable is wired as shown in FIG. 5 in which two pairs of lines (STB-ACK and AFD-BUSY) perform the byte-by-byte transfer under hardware control from the ECP port. As bytes are sent to the parallel port the information is transferred automatically by the port hardware. Two pairs of lines (the INIT-ERR crossed pair and the SLIN-PE crossed pair) perform all protocol flow control and are controlled by the driver under software control, although the ERR input can cause a hardware interrupt in both the VLT and PC (used by driver).

If, at any time, both ends of the link try to talk at the same time an electrical contention results, causing a possible hardware failure. In case a fatal error occurs, the cable comprises 120 ohm resistors in series with each data line so as to prevent electrical damage.

The second of the client layers (the presentation layer) performs error checking and packet assembly. A send cycle is followed by a receive cycle, which is followed by a send cycle, and so on, and multiple packets are received (or sent) at one time, without a switch in direction. A checksum verification is done after all packets of a message (which could be a file) have been received.

The top-level client software (the application) does not receive any notification that there has been a transmission or reception error and all resending or requesting for resend is done in transport layer to simplify the application level.

When a message (e.g. a file) is sent it is broken up into smaller chunks called packets (as the message is passed down from the application, through the transport layer, onto the link layer it is cut up into manageable pieces).

As shown in FIG. 2 the application layer passes a full message to the transport layer where it is augmented with a header which adds information such as a command, the length of the entire message, a header checksum and a message checksum. The transport layer divides up the message (now with a header) into sendable packets, all less than 60 kB. Each packet is provided with another piece of information, added before transmission, to indicate the sequence of that packet (this being used by the receiving end to reassemble the packets in a proper order). The highest layer, the application layer, consists of commands to request data, transfer information, and send/receive status data.

The following is a summary of the commands available to the application layer:

| | |
|---|---|
| REQUEST FILE | Send request from VLT to host for a file of name nnnn |
| SEND FILE | Send a file from the VLT to the host of name nnnn |
| THANKS | Positive acknowledgement from VLT to host |
| NAK | Negative acknowledgement from VLT to host |
| TOMBSTONE | Send VLT-specific information from VLT to host |
| GOODBYE | Break link from VLT to host |
| LOG | Send information from VLT to be put in log file |
| STATUS | Send information from VLT to be put in status bar |
| PROGRESS | Send information from VLT to be put in progress bar |

These commands are available only to the VLT and represent the only commands that can be issued. The host PC cannot send a file on its own; it can only send a file in response to a Request File command received from the VLT. The last three of the foregoing commands viz. Log, Status and Progress are local download-specific commands for the user interface on the host computer. (Therefore, they are not used for remote downloading). Also, the Tombstone command is not used for remote downloading.

B. Remote Downloading

The primary differences between local and remote downloading fall into the following three categories:

1. No electronic security key is needed for the third decryption key.
2. The lowest level of the communications protocol changes from parallel port signalling to TCP/IP over Ethernet (10 Mbps or 100 Mbps). That is, the application layer is equivalent to that of the local downloading software but the two lower levels are replaced by Ethernet TCP/IP link and transport layers.
3. The packs are held in a temporary location being either a site controller or one of the VLTs in the local area network.

Instead of using an electronic security key, the remote downloading method provides the third encryption key to the client by means of a secure transmission achieved by passing the key, encrypted with a previous floating key, over the site communications protocol. This site protocol is a different protocol dealing with accounting, game enrolling, etc., upon which the downloading of packs can occur and the floating key is provided as a function of the site protocol. The site protocol includes facilities for starting a download session. Like the local download process, the following steps are directed to the VLT requesting packs, using them, restarting itself and continuing on.

The difference in the communications links means changing from a dedicated, point-to-point link over a parallel port to communications over a TCP/IP local area network. Since the physical medium protocol is already defined in the TCP/IP specification, no extra coding is provided n the VLT. The VLT remains responsible for assembling packets into messages (in the transport layer, usually less than 4 kB per packet) and, otherwise, the process is the same as for local downloading.

The third difference refers to the device in which the new release resides. No PC (laptop) is required for remote downloading but a device is required to hold the release; this device may be the site controller or one of the VLTs. The method of getting the release to the site controller or VLT depends on the wide area network link, which may be an analog modem, a digital modem (ISDN), or a faster Internet link.

The individual electronic and processing functions utilised in the foregoing described preferred embodiment are, individually, well understood by those skilled in the art. It is to be understood by the reader that a variety of other implementations may be devised by skilled persons for substitution. Persons skilled in the field of communication design will be readily able to apply the present invention to an appropriate implementation method for a given application.

Consequently, it is to be understood that the particular embodiment shown and described herein by way of illustration is not intended to limit the scope of the invention claimed by the inventors which is defined by the appended claims.

What is claimed is:

1. An electronic downloading system, comprising:
   a gaming terminal, the gaming terminal further comprising,
      a first resident security key,
      a first resident electronic information,
      a receiving component, and
      a decrypting component;
   a host device;
   a second encrypted electronic information, the second encrypted electronic information transmitted from the host device and received by the receiving component;
   a second non-resident security key residing outside the gaming terminal and received by the gaming terminal separately from the first resident security key and the second encrypted electronic information; and
   a second decrypted electronic information to replace the first resident electronic information, the second decrypted electronic information decrypted from the second encrypted electronic information by the decrypting component with at least the first resident security key and the second non-resident security key.

2. A system according to claim 1, further comprising a communications link between the host device and the receiving component.

3. A system according to claim 2, wherein the communication link comprises a cable coupled to parallel ports of the host device and the receiving component.

4. A system according to claim 3, wherein the cable is wired to provide crossed control lines and bidirectional communications for data transfer.

5. A system according to claim 2, wherein the communications link comprises a secure network.

6. A system according to claim 2, wherein the communications link comprises a wide area Ethernet network.

7. A system according to claim 1, further comprising a removable storage media removably attached to the gaming terminal, the removable storage media configured to receive and to transmit electronic information.

8. A system according to claim 1, further comprising a removable storage media removably attached to the gaming terminal, the removable storage media configured as a non-network connection.

9. A system according to claim 1, the gaming terminal further comprising an encrypted master reset component, the decrypting component configured to decrypt the encrypted master reset component with the second non-resident security key.

10. A system according to claim 1, wherein the second non-resident security key comprises information to determine a version information of the second encrypted electronic information.

11. A system according to claim 1, the gaming terminal further comprising a nonvolatile memory to store the second decrypted electronic information.

12. A system according to claim 1, wherein the second decrypted information comprises game application code.

13. A system according to claim 1, wherein the second decrypted information comprises game system modules.

14. A system according to claim 1, wherein the second decrypted information comprises game graphics and audio files.

15. A system according to claim 1, wherein the second decrypted information comprises new release game software files.

16. A system according to claim 1, further comprising:
   a third encrypted electronic information;
   a third non-resident security key, the third non-resident security key residing outside the gaming terminal and received by the gaming terminal with the second encrypted electronic information; and
   a third decrypted electronic information to replace the second decrypted electronic information, the third decrypted electronic information obtained decrypted from the third encrypted electronic information by the decrypting component with at least the first resident security key and the third non-resident security key.

17. A system according to claim 16, wherein the third non-resident security key is packaged with the second encrypted electronic information into one file for transmission to the gaming terminal.

18. A system according to claim 16, wherein the host device is local to the gaming terminal.

19. A system according to claim 16, wherein the host device is in the same geographic location as the gaming terminal.

20. A system according to claim 16, wherein the host device is remote from the gaming terminal.

21. A system according to claim 1, wherein
   the decrypting component is configured to,
      decrypt the second encrypted information into an interim result with the first resident security key, and
      decrypt the interim result into the second decrypted information with the second non-resident security key.

22. A method for securely downloading information to a gaming terminal, comprising:
   transmitting a second encrypted electronic information from a host device;
   receiving the second encrypted electronic information at the gaming terminal;
   receiving at the gaming terminal a second non-resident security key separately from a first resident security key and the second encrypted electronic information;
   decrypting the second encrypted electronic information into a second decrypted electronic information at the gaming terminal with at least the first resident security key and the second non-resident security key; and
   replacing a first resident electronic information at the gaming terminal with the second decrypted electronic information.

23. A method according to claim 22, wherein the transmitting the second encrypted electronic information and receiving the second encrypted electronic information occurs over a communications link.

24. A method according to claim 23, wherein the communication link comprises a cable coupled to parallel ports of the host device and the receiving component.

25. A method according to claim 23, wherein the communications link comprises a secure network.

26. A method according to claim 23, wherein the communications link comprises a wide area Ethernet network.

27. A method according to claim 23, wherein the transmitting is accomplished with a physical electronic key removably attached to the gaming terminal.

28. A method according to claim 22, further comprising decrypting an encrypted master reset component in the gaming terminal with the second non-resident security key.

29. A method according to claim 22, further comprising determining a version information of the second encrypted electronic information with an information in the second non-resident security key.

30. A method according to claim 22, further comprising storing the second decrypted electronic information in the gaming terminal in a nonvolatile memory.

31. A method according to claim 22, wherein the second decrypted information comprises game application code.

32. A method according to claim 22, wherein the second decrypted information comprises game system modules.

33. A method according to claim 22, wherein the second decrypted information comprises game graphics and audio files.

34. A method according to claim 22, wherein the second decrypted information comprises new release game software files.

35. A method according to claim 22, wherein the decrypting the second encrypted electronic information into a second decrypted electronic information further comprises,
    decrypting the second encrypted electronic information into an interim result with the first resident security key at the gaming terminal, and
    decrypting the interim result into the second decrypted electronic information with the second non-resident security key at the gaming terminal.

36. A method according to claim 22, further comprising:
    transmitting a third encrypted electronic information from the host device;
    receiving the third encrypted electronic information at the gaming terminal;
    receiving a third non-resident security key with the second encrypted electronic information at the gaming terminal;
    decrypting the third encrypted electronic information into a third decrypted electronic information at the gaming terminal with at least the first resident security key and the third non-resident security key; and
    replacing the second decrypted electronic information with the third decrypted electronic information.

37. A method according to claim 36, further comprising packaging the third non-resident security key and the second encrypted electronic information into one file.

38. A method according to claim 36, wherein the host device is local to the gaming terminal.

39. A method according to claim 36, wherein the host device is in the same geographic location to the gaming terminal.

40. A method according to claim 36, wherein the host device is remote from the gaming terminal.

41. The method of claim 36, further comprising:
    replacing the first resident security key with the third resident security key.

* * * * *